United States Patent Office 3,296,873
Patented Jan. 10, 1967

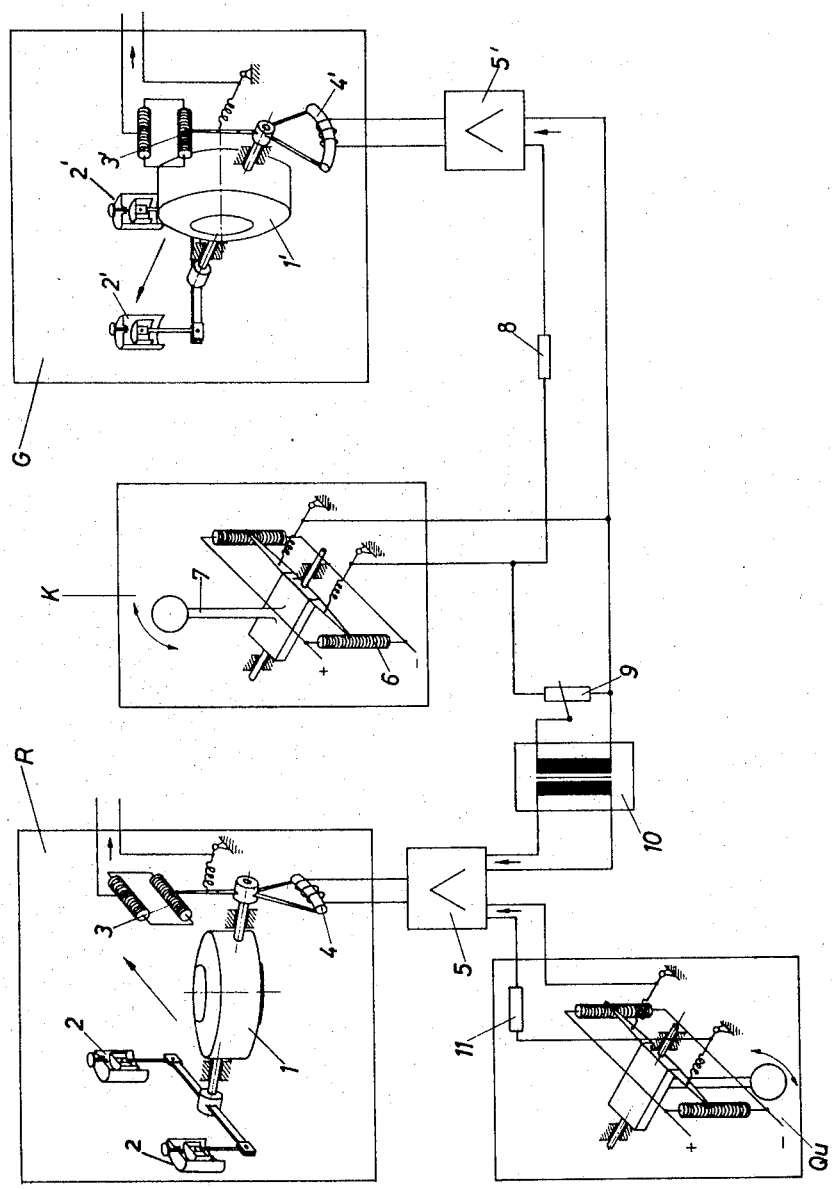

3,296,873
AUTOMATIC PILOT
Waldemar Möller, Heiligenberg, Baden, Germany, assignor to Bodenseewerk Perkin-Elmer & Co. G.m.b.H., Überlingen (Bodensee), Germany
Filed Aug. 31, 1964, Ser. No. 393,078
Claims priority, application Germany, Oct. 26, 1963, 74,036
6 Claims. (Cl. 74—5.34)

GENERAL

The present invention relates to an automatic pilot and more particularly to a device for initiating and co-ordinating a turn.

It is common to provide three gyros to stabilize the attitude or orientation of an airplane in space. Each gyro stabilizes the attitude of the airplane with respect to one of three axes. Specifically, one gyro is associated with the yaw axis, a second with the roll axis and the third with the pitch axis. Deviations in the attitude of the airplane, for example, due to gusts are corrected by control signals which are fed to servo-motors which drive the control surfaces of the airplane.

In order to change the flight path of an airplane in a horizontal plane at a rate of turn $w$, it is necessary to rotate the airplane about the roll axis into a banked position. This positions the airplane properly so that the necessary aerodynamic forces perpendicular to the flight direction act on the wings in the manner required to fly a turn. The rate of turn $w$ and the bank angle $\gamma$ should be carefully selected so that the turn is "coordinated," that is, that during the turning maneuver the apparent vertical is perpendicular to the transverse axis of the airplane. The bank angle necessary to effect this condition depends upon the flight velocity and the rate of turn and can be derived from:

$$\tan \gamma = vw/g$$

where $v$ is the flight velocity. If "coordination" during the turn is lacking, a lateral acceleration parallel to the transverse axis of airplane results. The airplane undergoes side slip or skid. Therefore, in order to fly a turn, signals are supplied both to the yaw stabilizer which stabilizes the attitude of the airplane about the yaw axis against interfering influences and to the roll stabilizer which banks the airplane.

It is apparent from the above equation that the ratio of the tangent of the bank angle ($\tan \gamma$) to the rate of turn ($w$) during a coordinated turn depends upon the flight velocity ($v$). It is well known to automatically change the ratio of the turn commands supplied to the yaw and roll stabilizers as a function of flight velocity. Flight velocity data is derived from a velocity head, air pressure and temperature measurements. Such velocity data is, however, subject to considerable error. The bank angle computed from this data is measured with respect to the vertical directed toward the center of the earth. This "true vertical" is measured in an airplane by means of gyroscopic apparatus and such apparatus is subject to errors during the turn maneuver. Thus, exact coordination of a turn cannot be achieved by the method just described. Only an approximately correct bank angle can be achieved.

Because of the foregoing an apparent vertical pick-up, comprising a lateral accelerometer or an apparent vertical pendulum for measuring the angle between the apparent vertical and the yaw axis, or a device for measuring the angle of side-slip has been provided. This apparent vertical pick-up supplies a correction signal to a mixing amplifier which drives the aileron servo-motor.

The apparent vertical pendulum is, however, susceptible to being driven into uncontrolled oscillations by movements of the air. Therefore, the signal from the apparent vertical pick-up must not be supplied to the roll stabilizer with too great an amplitude since the uncontrolled oscillations can cause oscillations of the entire airplane.

Attempts have been made to avoid this difficulty first by introducing the apparent vertical pick-up signal at reduced amplitude and second by integrating this signal and introducing the integrated signal. In this manner the oscillations are averaged out, but the signal caused by a mean apparent vertical angle grows steadily with time, so that the signal amplitude necessary for correction will finally be reached. This mode of operation, however, suffers from the disadvantage that the damping in the control loop is reduced.

Pitch, yaw and roll stabilizers can be built with free gyros. However, stabilizers composed of integrating restrained gyros are particularly advantageous. A restrained gyro, as is well known, produces a torque about its precession axis which is proportional to the angular velocity about the input axis. A gyro having a pure spring restraint and equipped with an appropriate pick-off device can develop an electrical signal corresponding to the deflection of the gyro. If provision is made so that the restraint yields in such a manner that the rate of deflection is proportional to the precession torque, a signal can be derived from the pick-off device which for at least one term is proportional to the angle of turn about the input axis. This result can be achieved by employing the well known technique of effecting the restraint of the gyro by pistons which slide in air cylinders which are provided with throttled outlets. At first the air volume contained in the cylinders acts as an "air spring." When the "air spring" is compressed due to the presence of a precession torque the air pressure within the cylinder is increased and air flows out through the throttled outlet. The greater the precession torque, the higher the pressure and the quicker the air flow. In this way, the deflection of the gyro is, at first, proportional to the precession torque because of the compression of the air spring and the fact that the gyro moves at a rate proportional to the respective precession torque because of the air flowing out of the throttled outlets. Since the precession torque is proportional to the angular velocity about the input axis, the gyro provides an output signal which is a linear function of angle of turn and of angular velocity. The terms of this function can be varied by changing the air volume, or the cross-section of the throttling members.

Equivalent gyros having electrical restraints are also well known. One such device is shown in U.S. Patent 3,082,628.

It is an object of the present invention to provide a new and improved automatic pilot.

It is another object of the present invention to provide a new and improved automatic pilot which is simple in construction and inexpensive to fabricate.

It is a further object of the present invention to provide a new and improved automatic pilot which permits flying an exactly coordinated turn.

It is still another object of the present invention to provide a new and improved automatic pilot which is not subject to the limitations and shortcomings of prior art devices provided for the same purposes.

An automatic pilot for a vehicle constructed according to the present invention includes an integrating restrained gyro for roll stabilization and a motor acting on the gyro about the precession axis thereof. Also included are means for monitoring the attitude of the gyro and for developing a first signal proportional to the deviation of the yaw axis of the vehicle from a desired vertical axis along with means for supplying the first signal to the motor. The invention additionally includes means for developing a second signal proportional to the desired rate of turn of the vehicle and means for differentiating the second signal and for supplying the differentiated signal to the motor.

For a better understanding of the present invention, together with other and further objects thereof, reference is had to the following description, taken in connection with the accompanying drawing, and its scope will be pointed out in the appended claims.

Referring to the drawing, there is shown an automatic pilot system constructed in accordance with the present invention.

DESCRIPTION AND OPERATION OF INVENTION

Referring to the drawing, an automatic pilot constructed according to the present invention includes a roll stabilizer R and a yaw stabilizer G. Also included are a command transmitter K and a lateral accelerometer or apparent vertical pick-up $Qu$.

Roll and yaw stabilizers R and G each include gyros 1 and 1', respectively, which are restrained about their precession axes by air cylinders 2, 2 and 2', 2', respectively. The air cylinders 2, 2 and 2', 2' are provided with throttling outlets so that they operate in the manner previously described. This mode of operation results in a deflection of the gyro which is a linear function of the torque about the precession axis and of the time integral thereof.

The gyro 1 is so arranged in the airplane that in its rest position its spin axis is parallel to the yaw axis while the axis of precession is parallel to the transverse or pitch axis of the airplane. Thus, it responds to movements of the airplane about its longitudinal or roll axis. This results in stabilizing the roll attitude of the airplane.

The gyro 1' is so arranged in the airplane that in its rest position its spin axis is parallel to the transverse or pitch axis while its precession axis is parallel to the longitudinal or roll axis of the airplane. Thus, it responds to movements of the airplane about the vertical or yaw axis. This results in stabilizing the yaw attitude of the airplane.

A similar gyro stabilizes the movements of the airplane about the pitch axis but since this is not connected with the present invention it has not been shown in the drawing.

The deflections of gyros 1 and 1' are sensed by potentiometer pick-offs 3 and 3', respectively, which develop electrical signals proportional to the deflections. After appropriate amplification, these signals are fed in the usual manner to servo-motors which are not shown in drawing. The servo-motors drive the ailerons and the rudder of the airplane.

Pneumatic integrating restrained gyros of the type which may be utilized in the present invention have been described in the specification of British Patent 895,064.

Upon a roll movement of the airplane which, for example, may be due to a gust, the gyro 1 produces a torque about its precession axis. A compression of the air within one of the cylinders 2, 2 and an expansion of the air within the other cylinder take place thus effecting a deflection of the gyro which is proportional to the torque and therefore to the rate of roll. In addition, air flows out of one of the cylinders and into the other cylinder through the throttled outlets so that there is a yield in the restraint and a further deflection of the gyro proportional to the integral of the rate of roll and thus to the roll angle. This deflection causes the development of a signal by the pick-off 3 and this signal, in turn, causes a movement of the ailerons which corrects for or counteracts the roll movement. Thus, gyro 1 effects a stabilization of the airplane against external disturbances about its roll axis. In a similar manner, gyro 1' effects stabilization of the airplane about its yaw axis.

If during straight flight the airplane should for one reason or another be in a banked position the apparent vertical pick-up $Qu$ develops a signal since the vertical is oblique with respect to the yaw axis of the airplane. This signal is fed through an amplifier 5 to a torque motor 4 which develops a torque about the precession axis of gyro 1, in turn, causing a deflection of gyro 1. This deflection causes the development of a signal by pick-off 3 which duly causes a return of the airplane into the proper horizontal attitude. In this manner the apparent vertical pick-up keeps the transverse or pitch axis of the airplane horizontal during straight flight since each deviation from this position would result in a signal being supplied to the torque motor 4 which, in turn, causes a gyro deflection and a corresponding control signal.

Due to the integrating effect of the restraining means 2, the control signal developed by pick-off 3 becomes a linear function of the apparent vertical signal and of the integral thereof. By adjusting the value of an adjustment resistor 11, the signal from the apparent vertical pick-up $Qu$ is introduced at reduced amplitude so that actually only the integral of the apparent vertical signal is effective. This integration is achieved by feeding the apparent vertical signal to the torque motor 4 of the roll gyro 1. In this way oscillations of the apparent vertical pick-up $Ou$, for example, due to impact or vibrations are averaged out so that they are not effective in the control signals. It should be noted that a separate integrator for the apparent vertical signal and a mixing amplifier for the apparent vertical signals and the stabilizing signals are unnecessary. The gyro itself adds the signals of the apparent vertical pick-up acting on the torque motor and the stabilizing signals due to interfering movements of the airplane about its roll axis. Both types of movements cause torques about the precession axis which result in a gyro deflection and the development of a signal.

The integrated signal increases very slowly. Although the airplane is returned to its horizontal attitude in due time hunting is avoided. The movement of the ailerons is such that the torque of the gyro about its precession axis caused by the rate of roll during the return to horizontal attitude substantially balances the torque produced by torque motor 4.

In order to fly a turn, a turn command signal proportional to the desired rate of turn is supplied from the command transmitter K by means of a potentiometer bridge 6. As shown in the drawing, this turn command signal may be initiated by means of a control stick 7. However, a radar or localizer beam may be used instead.

The turn command signal from transmitter K is supplied to a torque motor 4' through a resistor 8 and an amplifier 5'. This signal develops a stationary torque at torque motor 4' which at first causes a deflection of the gyro 1' proportional to the signal and then a further movement of the gyro at a rate proportional to the signal. Pick-off 3' develops a corresponding signal and supplies it to the servo-motor of the rudder. The rudder effects such a rotation of the airplane that the torque produced by gyro 1' as a result of the rotation of the airplane about the yaw axis substantially balances the torque of torque motor 4'.

Theoretically, it would appear that in order to fly a turn, the turn command signal need be supplied only to the yaw stabilizer which effects turning the airplane at a rate of turn $w$. A centrifugal acceleration would be produced which causes the development of a signal by the apparent vertical pick-up which signal is supplied to the roll stabilizer. This signal would cause a rotation of the airplane into correct bank attitude for a coordinated turn. However, with such operation so strong an integrated apparent vertical signal would be necessary that there would be a reduction of damping resulting in hunting. If the amplitude of the apparent vertical signal were reduced to too low a level the time required to achieve a correct bank attitude would be too long.

Because of this, a pulse-shaped signal is, at first, supplied to the torque motor to position the airplane in proper bank attitude when a turn is to be initiated. This pulse-shaped signal is integrated by the integrating restraint of the gyro and quickly turns the airplane into a bank position which approximately corresponds to a coordinated turn. The signal from the apparent vertical pick-up is necessary only to correct this bank attitude and may therefore be introduced at reduced amplitude.

In order to attain the necessary bank angle during a turn, the signal from the potentiometer bridge 6 is also applied across the primary winding of a transformer 10 through an adjustable potentiometer 9. The output at the secondary winding of transformer 10 is added to the signal from the apparent vertical pickup $Qu$. The transformer 10 is so designed that its core is driven into saturation at high input currents. Thus, the output signal of the transformer is limited.

In the stationary state, no output signal is developed by transformer 10 since a D.-C. voltage is being applied to potentiometer 6 and therefore also to the primary winding of the transformer. When the control stick 7 is moved from its rest position in any direction in order to initiate a turn, there is an increase in the voltage across the primary winding of transformer 10. A pulse-shaped signal is thereby produced across the secondary winding of transformer 10 which corresponds substantially to the time derivative of the change in the input signal, provided, however, that the transformer is not yet saturated. This pulse-shaped signal produces a corresponding torque at torque motor 4. The integrating restraint of the gyro 1 causes the gyro to deflect because of this pulse-shaped torque. This deflection is proportional to the time integral of the torque and with perfect differentiation by transformer 10 is proportional to the signal change at the primary winding of the transformer.

The gyro deflection, in turn, causes the development of a signal by pick-off 3 which, in turn, causes actuation of the ailerons. This results in a rotation of the airplane about its roll axis and the creation of precession torques so that the signal at pick-off 3 is reduced to zero. Potentiometer 3 may be adjusted or calibrated so that the airplane is at this time at least approximately in the proper bank attitude necessary for the particular rate of turn. The adjustment of potentiometer 9 can be effected automatically as a function of the flight velocity measurement in the well known manner.

So long as the transformer 10 performs exact differentiation, the bank angle is proportional to the rate of turn. This is true so long as tangent $\gamma$ is approximately equal to $\gamma$. For higher values of $\gamma$ or $w$ this relationship is no longer true. For example, $\gamma$ should not be greater than 90°. For greater input currents to the primary winding of the transformer 10, the transformer core is driven to saturation. A further increase in the rate of turn signal does not cause any further increase in the magnetic flux and therefore a signal in the secondary winding. Because of this a large tangent function can be simulated to a good approximation.

Instead of operating the command transmitter K continuously as shown in the drawing, a switch may be provided to switch on a rate of turn signal for a fixed standard right or left turn.

While there has been described what is at present considered to be the preferred embodiment of this invention, it will be obvious to those skilled in the art that various changes and modifications may be made therein without departing from the invention, and it is therefore aimed to cover all such changes and modifications as fall within the true spirit and scope of the invention.

What is claimed is:

1. In an automatic pilot for a vehicle having freedom of motion about roll and yaw axes,
   an integrating restrained gyro for roll stabilization and having a precession axis, a spin axis perpendicular to said precession axis and an axis mutually perpendicular to said precession and spin axes;
   a motor acting on said gyro about the precession axis of said gyro;
   means for determining the deviation of the yaw axis from the apparent vertical about the roll axis and for developing a first signal proportional to said deviation;
   means for developing and differentiating a second signal which is proportional to the desired rate of turn of said vehicle;
   and means for adding and applying said first signal and said second differentiated signal to said motor.

2. An automatic pilot according to claim 1 wherein the restraint of the gyro is effected by air cylinders having throttled outlets.

3. An automatic pilot according to claim 1 wherein the differentiation of the second signal is performed by a saturable core transformer.

4. In an automatic pilot for a vehicle having freedom of motion about roll and yaw axes,
   a first integrating restrained gyro for roll stabilization and having a precession axis, a spin axis perpendicular to said precession axis and an axis mutually perpendicular to said precession and spin axes;
   a first torque motor acting on said first gyro about the precession axis of said first gyro;
   means for determining the deviation of the yaw axis from the apparent vertical about the roll axis and for developing a first signal proportional to said deviation;
   means for developing and differentiating a second signal which is proportional to the desired rate of turn of said vehicle;
   a second gyro for yaw stabilization having a precession axis, a spin axis perpendicular to said precession axis and an axis mutually perpendicular to said precession and spin axes;
   a second torque motor acting on said second gyro about the precession axis of said second gyro;
   means for adding and applying said first signal and said second differentiated signal to said first torque motor;
   and means for supplying said second signal to said second torque motor.

5. An automatic pilot according to claim 4 wherein the differentiation of the second signal is performed by a saturable core transformer.

6. An automatic pilot according to claim 4 wherein the second gyro is an integrating restrained gyro.

References Cited by the Examiner

UNITED STATES PATENTS

| 1,900,709 | 3/1933 | Henderson | 74—5.6 X |
| 2,649,264 | 8/1953 | Slater | 244—77 |
| 2,899,828 | 8/1959 | Lynn | 74—5.5 |
| 2,945,648 | 7/1960 | Oplinger | 244—77 |
| 3,079,803 | 3/1963 | Moller | 74—5.5 |

FRED C. MATTERN, JR., *Primary Examiner.*

BROUGHTON G. DURHAM, *Examiner.*

J. D. PUFFER, *Assistant Examiner.*